United States Patent
Yao

(10) Patent No.: US 9,355,781 B2
(45) Date of Patent: May 31, 2016

(54) LAMINATED CERAMIC CAPACITOR

(71) Applicant: MURATA MANUFACTURING CO., LTD., Nagaokakyo-Shi (JP)

(72) Inventor: Takayuki Yao, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 230 days.

(21) Appl. No.: 13/937,305

(22) Filed: Jul. 9, 2013

(65) Prior Publication Data

US 2013/0294011 A1 Nov. 7, 2013

Related U.S. Application Data

(63) Continuation of application No. PCT/JP2012/050297, filed on Jan. 11, 2012.

(30) Foreign Application Priority Data

Jan. 12, 2011 (JP) .................. 2011-003939

(51) Int. Cl.
  *H01G 4/30* (2006.01)
  *H01G 4/005* (2006.01)
  *H01G 4/06* (2006.01)
  *H01G 4/012* (2006.01)
  *H01G 4/12* (2006.01)

(52) U.S. Cl.
  CPC ............ *H01G 4/30* (2013.01); *H01G 4/012* (2013.01); *H01G 4/12* (2013.01); *H01G 4/1227* (2013.01)

(58) Field of Classification Search
  USPC ................. 361/301.4, 303, 311
  See application file for complete search history.

(56) References Cited

U.S. PATENT DOCUMENTS

| 6,205,014 | B1 * | 3/2001 | Inomata et al. ............. 361/312 |
| 7,335,329 | B2 * | 2/2008 | Nakano et al. ............. 264/615 |
| 8,179,662 | B2 | 5/2012 | Yao |
| 2002/0075632 | A1 | 6/2002 | Nakano et al. |
| 2004/0145856 | A1 | 7/2004 | Nakamura et al. |

(Continued)

FOREIGN PATENT DOCUMENTS

| CN | 100419923 C | 9/2008 |
| CN | 100559523 C | 11/2009 |
| JP | H06-45182 A | 2/1994 |

(Continued)

OTHER PUBLICATIONS

PCT/JP2012/050297 International Search report, dated Mar. 27, 2012.

(Continued)

*Primary Examiner* — Eric Thomas
(74) *Attorney, Agent, or Firm* — Arent Fox LLP

(57) ABSTRACT

Provide is a laminated ceramic capacitor which can suppress the decrease in dielectric constant even when ceramic layers are further reduced in thickness. The laminated ceramic capacitor includes a laminate having a plurality of stacked ceramic layers stacked and a plurality of internal electrodes formed along interfaces between the ceramic layers; and a plurality of external electrodes formed on the outer surface of the laminate and electrically connected to the internal electrodes ceramic grains in contact with both of adjacent internal electrodes adjacent with a ceramic layer interposed therebetween are present in the ceramic layers and the internal electrodes are 0.60 μm or less in thickness.

7 Claims, 2 Drawing Sheets

(56) References Cited

U.S. PATENT DOCUMENTS

2004/0176239 A1    9/2004   Nakamura et al.
2006/0177678 A1    8/2006   Iwanaga

FOREIGN PATENT DOCUMENTS

| JP | H06-342736 S | 12/1994 |
| JP | 11317322 | 11/1999 |
| JP | 2002-305124 A | 10/2002 |
| JP | 2004-256362 A | 9/2004 |
| JP | 2005-123252 A | 5/2005 |
| JP | 2006-041393 A | 2/2006 |
| JP | 2008-010530 A | 1/2008 |
| JP | 2008-016706 A | 1/2008 |
| JP | 200853488 | 3/2008 |
| JP | 2010-040798 A | 2/2010 |
| JP | 2010-153485 A | 7/2010 |

OTHER PUBLICATIONS

PCT Written Opinion of the International Searching Authorit, date of mailing Mar. 27, 2012.
Japanese Office Action, dispatch date Dec. 10, 2013, issued for corresponding application JP 2012-552728 (English translation attached).

* cited by examiner

LAMINATED CERAMIC CAPACITOR

This is a continuation of application Serial Number PCT/JP2012/050297, filed Jan. 11, 2012, the entire contents of which is incorporated herein by reference.

TECHNICAL FIELD

The present invention relates to a laminated ceramic capacitor.

BACKGROUND ART

Laminated ceramic capacitors as one of typical ceramic electronic components typically include: a laminate having a plurality of stacked ceramic layers and a plurality of internal electrodes formed along interfaces between the ceramic layers; and a plurality of external electrodes formed on the outer surface of the laminate and electrically connected to the internal electrodes.

With the recent progress of electronics technology, a reduction in size and an increase in capacitance have been required for laminated ceramic capacitors. In order to satisfy these requirements, a reduction in layer thickness has been advanced for ceramic layers of laminated ceramic capacitors. On the other hand, there is a desire to make ceramic grains larger in order to improve the dielectric constant. Since the number of ceramic grains arranged in the stacking direction of the ceramic layers is relatively reduced. For example, Patent Document 1 discloses a laminated ceramic capacitor characterized in that the ratio of a section of one grain per layer, that is, one ceramic grain formed in one ceramic layer, is 20% or more.

PRIOR ART DOCUMENTS

Patent Documents

Patent Document 1: Japanese Patent Application Laid-Open No. 11-317322

DISCLOSURE OF THE INVENTION

Problem to be Solved by the Invention

The section of one grain per layer, that is, one ceramic grain formed in one ceramic layer comes in contact with internal electrodes on both sides in the thickness direction, and thus has high stress applied in the thickness direction, thereby causing a problem of decrease in dielectric constant.

The present invention has been achieved in view of such a problem, and an object of the present invention is to provide a laminated ceramic capacitor which can suppress the decrease in dielectric constant even when ceramic layers are further reduced in thickness.

Means for Solving the Problem

In a laminated ceramic capacitor according to the present invention, which includes: a laminate having a plurality of stacked ceramic layers and a plurality of internal electrodes formed along interfaces between the ceramic layers; and a plurality of external electrodes formed on the outer surface of the laminate and electrically connected to the internal electrodes, ceramic grains in contact with both of the internal electrodes adjacent with the ceramic layers interposed therebetween are present in the ceramic layers, and the internal electrodes are 0.60 µm or less in thickness.

Furthermore, the percentage of the number of lines on which ceramic grains are present in contact with both of the adjacent internal electrodes in the laminated ceramic capacitor according to the present invention is preferably 5 to 20% of 100 lines drawn perpendicular to the internal electrodes at an interval of an average grain size for ceramic grains in a cross section of the ceramic layer.

Furthermore, the ceramic layers in the laminated ceramic capacitor according to the present invention preferably contain, as their main constituent, a perovskite-type compound containing Ba and Ti (where some of Ba is optionally substituted with at least one of Ca and Sr, and some of Ti is optionally substituted with Zr).

In addition, the ceramic layers in the laminated ceramic capacitor according to the present invention, are preferably 1 µm or less in thickness.

Advantageous Effect of the Invention

The laminated ceramic capacitor according to the present invention is able to provide a laminated ceramic capacitor which can suppress the decrease in dielectric constant by having, in ceramic layers, ceramic grains in contact with both of internal electrodes adjacent with the ceramic layers interposed therebetween and adjusting the internal electrode thickness to not more than a certain value.

MODE FOR CARRYING OUT THE INVENTION

An embodiment for carrying out the present invention will be described below.

Figure 1:
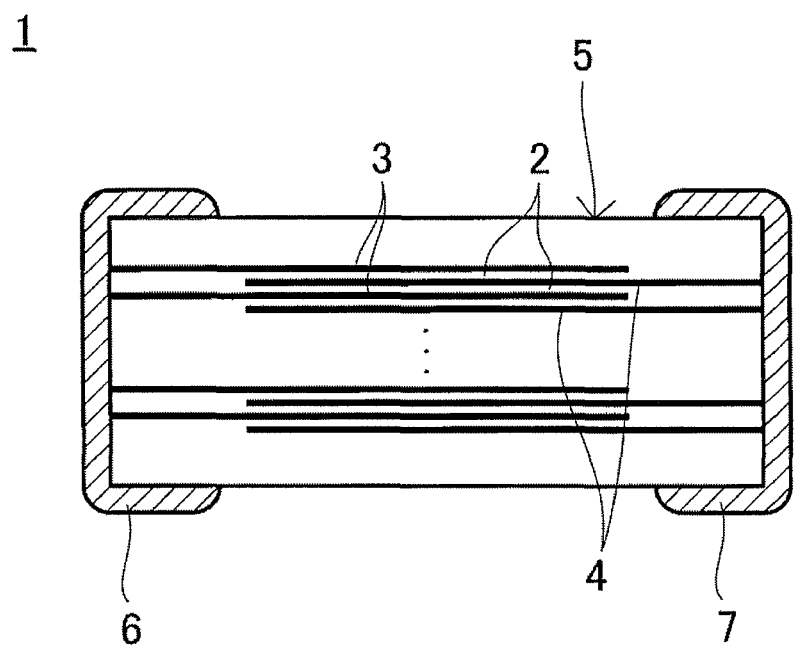
FIG. 1 is a cross-sectional view illustrating a laminated ceramic capacitor according to the present invention.

FIG. 1 is a cross-sectional view of a laminated ceramic capacitor according to the present invention.

A laminated ceramic capacitor 1 includes a laminate 5. The laminate 5 includes a plurality of stacked ceramic layers 2 and a plurality of internal electrodes 3 and 4 formed along interfaces between the plurality of ceramic layers 2. Materials for the internal electrodes 3 and 4 include, for example, materials containing Ni as their main constituent.

External electrodes 6 and 7 are formed in different positions from each other on the outer surface of the laminate 5. Materials for the external electrodes 6 and 7 include, for example, materials containing Ag or Cu as their main constituent. In the case of the laminated ceramic capacitor illustrated in FIG. 1, the external electrodes 6 and 7 are formed on respective end surfaces of the laminate 5, which are opposed to each other. The internal electrodes 3 and 4 are electrically connected respectively to the external electrodes 6 and 7. Further, the internal electrodes 3 and 4 are stacked alternately with ceramic layers 2 interposed therebetween in the laminate 5.

It is to be noted that the laminated ceramic capacitor 1 may be a two-terminal capacitor including two external electrodes 6 and 7, or may be a multi-terminal capacitor including a larger number of external electrodes.

In the laminated ceramic capacitor 1 according to the present invention, the ceramic layers 2 have therein ceramic grains in contact with both adjacent internal electrodes 3 and 4 with the ceramic layers 2 interposed therebetween. These ceramic grains are large in grain size, and thus contribute to an improvement in the dielectric constant of the ceramic layers 2.

In addition, when 100 lines are drawn perpendicular to the internal electrodes 3 and 4 at the interval of an average grain size for ceramic grains in a cross section of the ceramic layer 2, and ceramic grains in contact with both of the adjacent internal electrodes 3 and 4 are present on the lines, the percentage of the number of lines is preferably 5 to 20%.

The internal electrodes 3 and 4 are 0.6 µm or less in thickness in the present invention. The ceramic grains as described above contact both of the adjacent internal electrodes 3 and 4 in the thickness direction. Therefore, when the internal electrodes 3 and 4 are larger in thickness, high stress is applied from the internal electrodes 3 and 4 to the ceramic grains to decrease the dielectric constant. On the other hand, when the internal electrodes 3 and 4 are 0.6 µm or less in thickness, the stress applied to the ceramic grains is relaxed, and the dielectric constant of the ceramic layers 2 is thus improved.

The ceramic layers 2 preferably contain, as their main constituent, a perovskite-type compound containing Ba and Ti (where some of Ba is optionally substituted with at least one of Ca and Sr, and some of Ti is optionally substituted with Zr). In such a case, the dielectric constant of the ceramic layers 2 is further improved.

The dielectric layers 2 are preferably 1 µm or less in thickness. In such a case, the dielectric constant of the ceramic layers 2 is further improved.

The laminated ceramic capacitor 1 is, as an example, manufactured as follows.

First, a ceramic powder is prepared as a raw material for the ceramic layers. The ceramic powder is prepared, for example, by a solid-phase synthesis method. Specifically, first, compound powders such as oxides and carbonates including constituent elements for the main constituent are mixed in predetermined proportions, and subjected to calcination to prepare the ceramic powder. It is to be noted that a hydrothermal synthesis method, a hydrolysis method, etc. may be applied besides the solid-phase synthesis method.

The ceramic powder obtained in the way described above is used to prepare slurry. Then, green sheets are formed by a sheet forming method or the like. Then, a plurality of ceramic green sheets are stacked and then subjected to pressure bonding to obtain a raw laminate. Next, the raw laminate is subjected to firing. In this firing step, the ceramic powder is fired to obtain ceramic layers including the dielectric ceramic. Thereafter, external electrodes are formed by baking or the like on end surfaces of the laminate.

Next, experimental examples will be described which were carried out according to this invention.

Experimental Example 1

In Experimental Example 1, evaluated were laminated ceramic capacitors including ceramic layers containing, as their main constituent, a $BaTiO_3$ based ceramic, with a controlled percentage of ceramic grains present in contact with both of adjacent internal electrodes and a controlled internal electrode thickness.

(A) Preparation of Ceramic Powder

Respective powders of $BaCO_3$ and $TiO_2$ were prepared as starting raw materials for a $Ba_xTiO_3$ main constituent. Then, these powders were weighed for the amounts shown in Table 1, that is, so that the content of Ba was 100×x parts by mol=100×1.008 parts by mol=100.8 parts by mol with respect to 100 parts by mol of Ti, and mixed for a period of time in a ball mill with water as a medium. Thereafter, a ceramic powder as a main constituent was obtained by evaporative drying and calcination. In that regard, the calcination temperature was varied in the range of 900 to 1100° C. to vary the grain size of the ceramic powder main constituent. In this way, the percentage of ceramic grains which were present in contact with both of adjacent internal electrodes, and included in ceramic layers of subsequently prepared laminated ceramic capacitors was controlled.

Next, respective powders of $Dy_2O_3$, $MgCO_3$, $MnCO_3$, and $SiO_2$ were prepared as accessory constituents. These powders were weighed for the contents of Dy, Mg, Mn, and Si in terms of parts by mol in Table 1 with respect to 100 parts by mol of the Ti, and blended with the ceramic powder as a main constituent. Thereafter, the blend was mixed in a ball mill with water as a medium. The resulting mixture was subjected to evaporative drying, and crushed to obtain a ceramic powder.

It has been confirmed by an ICP emission spectrometric analysis that the obtained ceramic powder is nearly identical to the composition shown in Table 1.

It is to be noted that while Dy was selected as a accessory constituent in the present experimental example, the accessory constituents may be at least of La, Ce, Pr, Nd, Sm, Eu, Gd, Tb, Ho, Er, Tm, Yb, Lu, and Y, besides Dy. In addition, while Mg and Mn were selected as the accessory constituents, the accessory constituents may be at least one Ni, Fe, Cu, V, and Y, besides Mg and Mn.

TABLE 1

| x | Dy Amount (parts by mol) | Mg Amount (parts by mol) | Mn Amount (parts by mol) | Si Amount (parts by mol) |
| --- | --- | --- | --- | --- |
| 1.008 | 1.0 | 1.0 | 0.5 | 2.0 |

(B) Preparation of Laminated Ceramic Capacitor

First, green sheets to serve as ceramic layers were formed. Specifically, the ceramic powder of the compound represented in Table 1 was, with the addition of a polyvinyl butyral-based binder and ethanol thereto, subjected to wet mixing in a ball mill to prepare slurry. This slurry was formed by a LIP method into the shape of a sheet to obtain green sheets.

Next, a conductive paste containing Ni as its main constituent was applied by screen printing onto a predetermined number of green sheets thereby forming conductive paste films to serve as internal electrodes. In that regard, the thickness of the fired internal electrode was controlled by controlling the thickness of the conductive paste film being printed. It is to be noted that multiple samples that vary in internal electrode thickness (sample numbers 11 to 20) are prepared as described later in the present experimental example.

The multiple green sheets with the conductive paste films formed thereon were stacked so that the sides to which the conductive paste films drawn thereto were alternated, and then subjected to pressure bonding to obtain a raw laminate.

Next, the raw laminate was fired. Specifically, the binder was burned off by heating to a temperature of 300° C. in a reducing atmosphere. Thereafter, firing was carried out at a temperature of 1200° C. for 2 hours in a reducing atmosphere including a $H_2$—$N_2$—$H_2O$ gas with an oxygen partial pressure of $10^{-10}$ MPa.

It has been confirmed by an ICP emission spectrometric analysis that the sintered laminate obtained is nearly identical to the composition shown in Table 1, except for Ni as an internal electrode constituent.

Next, external electrodes were formed. Specifically, a Cu paste containing $B_2O_3$—$Li_2O$—$SiO_2$—$BaO$ glass frit was applied onto both end surfaces of the laminate. Thereafter, the Cu paste was baked by heating at a temperature of 800° C. in a nitrogen atmosphere. External electrodes electrically connected to the internal electrodes were formed in this way.

The laminated ceramic capacitor prepared in the way described above had external dimensions of: 1.0 mm in length; 0.5 mm in width; and 0.5 mm in thickness, the number of effective ceramic layers was 280, and the area of the internal electrode opposed per ceramic layer was 0.3 mm².

(C) Characterization

The multiple types of laminated ceramic capacitors (Sample Numbers 11 to 20) obtained were evaluated for various types of characteristics.

Measurement of Internal Electrode Thickness and Ceramic Layer Thickness

The internal electrode thickness and the ceramic layer thickness were measured for sample numbers 11 to 20 It is to be noted that as described above, the internal electrode thickness varies among sample numbers 11 to 20, because the conductive paste films printed on the green sheets varied in thickness. On the other hand, the ceramic layer thickness is nearly equal among sample numbers 11 to 20 because the green sheets are equal in thickness.

First, each sample was arranged perpendicularly, and surrounded and fixed with a resin.

The resin was used so as to expose the LT side surface (length-height side surface: side surface from which the internal electrodes including sections connecting to the external electrode are exposed when polishing is carried out) of each sample. The LT cross section was exposed by polishing the LT side surface with a polishing machine, and completing the polishing at ½ of the depth in the W direction (width direction) of the laminate. This polished surface was subjected to ion milling to remove sludge produced by the polishing. In this way, cross sections for observation were obtained.

Figure 2:
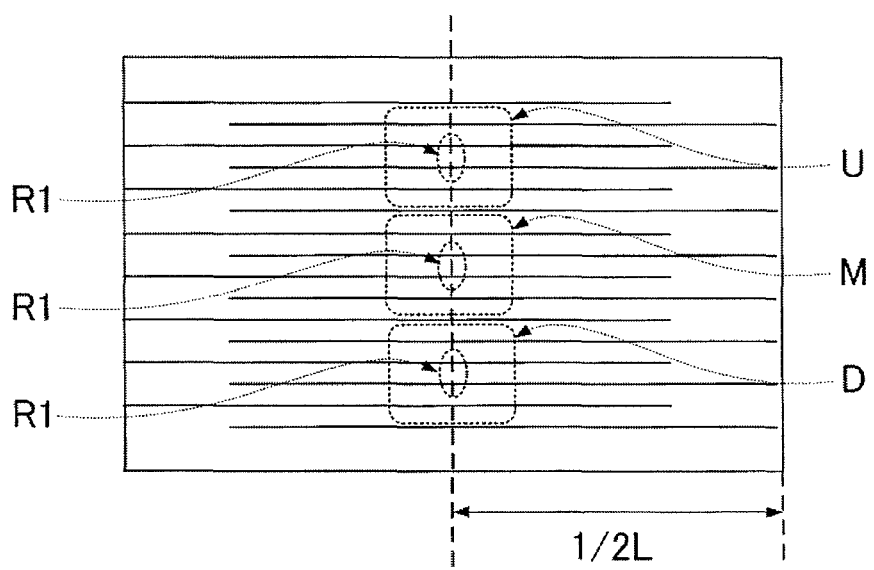
FIG. 2 is an explanatory diagram illustrating a method carried out in experimental examples, for measuring an internal electrode thickness and a ceramic layer thickness.

As illustrated in FIG. 2, a line perpendicular to the internal electrodes was drawn at ½ of the LT cross section in the L direction (length direction). Next, a region of the sample with the stacked internal electrodes was divided equally in the T direction (height direction) into three regions of: upper section U; middle section M; and lower section D. Then, twenty-five internal electrodes were selected from a central section in the height direction of each region (a region including the twenty-five internal electrodes is shown as a measurement region R1 in FIG. 2), and the thickness for these internal electrodes was measured on the perpendicular line. Excluded were the outermost internal electrodes, and internal electrodes which were unmeasurable due to the fact such as that the defective internal electrode on the perpendicular line made a connection between the ceramic layers sandwiching the internal electrode.

For each sample, the thickness for the internal electrodes was then measured at seventy-five points to obtain the average value of the measurements.

The thickness for the internal electrodes was measured with the use of a scanning electron microscope.

Table 2 shows the thickness of each internal electrode for sample 11 to 20.

TABLE 2

| Sample Number | Percentage of Number of Lines (%) | Internal Electrode Thickness (μm) | Dielectric Constant (25° C.) |
|---|---|---|---|
| 11 | 5 | 0.50 | 4600 |
| 12 | 18 | 0.55 | 5200 |
| 13 | 10 | 0.60 | 4800 |
| *14 | 0 | 0.74 | 2800 |
| *15 | 0 | 0.64 | 2400 |
| *16 | 0 | 0.60 | 2200 |
| *17 | 0 | 0.50 | 2000 |
| *18 | 10 | 0.75 | 3400 |
| *19 | 7 | 0.70 | 3200 |
| *20 | 12 | 0.61 | 3300 |

Subsequently, the ceramic layer thickness was measured for each sample. The measurement method was based on the above-mentioned method for measuring the internal electrode thickness. It is to be noted that in the measurement of the ceramic layer thickness, ceramic layers which were unmeasurable due to the fact such as that the defective internal electrode on the perpendicular line made a connection between the ceramic layers sandwiching the internal electrode were excluded.

For each sample, the thickness for the ceramic layers was measured at seventy-five points to obtain the average value of the measurements.

The thickness of the ceramic layer interposed between adjacent internal electrodes was nearly equal among the respective samples, was 0.8 μm.

Percentage of Number of Lines

The respective samples of sample numbers 11 to 20 were placed perpendicularly, and surrounded and fixed with a resin. In this case, the resin was used so as to expose the LT side surface (length-height side surface: side surface from which the internal electrodes including sections connecting to the external electrode are exposed when polishing is carried out) of each sample. The LT cross section was exposed by polishing the LT side surface with a polishing machine, and completing the polishing at ½ of the depth in the W direction (width direction) of the laminate. This polished surface was subjected to ion milling to remove sludge produced by the polishing. Thereafter, a heat treatment was carried out to make grain boundaries clear. While the heating was carried out at 1100° C. in this case, the temperature can be appropriately selected depending on the samples for the measurement. In this way, cross sections for observation were obtained.

Figure 3:
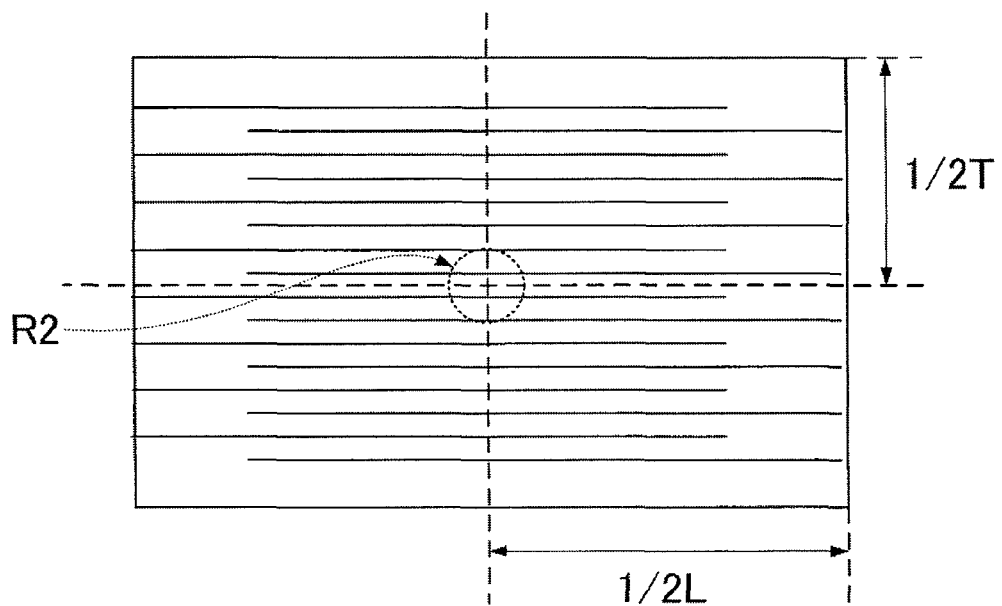
FIG. 3 is an explanatory diagram illustrating a method carried out in experimental examples, for measuring grain sizes of ceramic grains.

As shown in FIG. 3, a measurement region R2 of the polished surface was photographed at 10000-fold magnification under a SEM. The measurement region R2 was regarded as a region in the vicinity of the point corresponding to ⅔ in each of L and T directions of the polished cross section. The number of grains for the measurement was n=200 randomly selected in the measurement region R2. Then, the grain size was measured for the 200 grains by using a diameter method of determining, as the grain size, the maximum length of each grain in a direction parallel to the internal electrode, and an average value of the grain sizes was calculated.

Next, in one ceramic layer located at ½ in the T direction of the polished cross section, 100 lines were drawn at an interval of the average grain size obtained above perpendicular to the internal electrodes, the number of lines on which ceramic grains were present in contact with both of the adjacent internal electrodes with the ceramic layer interposed therebetween was counted, and the percentage of the number of the lines was obtained with respect to the 100 lines.

Dielectric Constant

The electrostatic capacitance was measured for the ceramic capacitors of samples 11 to 20, and the dielectric constant was calculated from the ceramic layer thickness and the opposed area of the internal electrode. The electrostatic capacitance was measured under the conditions of temperature: 25° C.; 1 kHz; and AC voltage: 0.5 Vrms.

Table 2 shows the results of the percentage of the number of lines, the internal electrode thickness, and the dielectric constant. It is to be noted that sample numbers marked with * in Table 2 refer to samples outside the scope of the present invention.

In regard to sample numbers 14 to 17, the percentage of the number of lines on which ceramic particles are present in contact with both of the adjacent internal electrodes is 0%, and the dielectric constant is low regardless of the internal electrode thickness. In regard to sample numbers 18 to 20, while ceramic particles are present in contact with both of the internal electrodes, the internal electrode thickness is 0.61 to 0.75 μm, and the dielectric constant is low. On the other hand, in sample numbers 11 to 13, the percentage of the number of lines is 5 to 18%, and the internal electrode thickness is 0.50 to 0.60 μm. Furthermore, the dielectric constant is 4600 to 5200, i.e., not less than 4500.

Experimental Example 2

In Experimental Example 2, evaluated were laminated ceramic capacitors including ceramic layers containing, as their main constituent, a (Ba,Ca)TiO$_3$ based ceramic.

(A) Preparation of Ceramic Powder

As starting raw materials for $(Ba_{0.9}Ca_{0.1})_xTiO_3$ as a main constituent, a CaCO$_3$ powder was prepared in addition to the starting raw materials in Experimental Example 1. Then, these powders were weighed in the amounts shown in Table 3, that is, so that with respect to 100 parts by mol of Ti, the content of Ba was 100×x×0.9 parts by mol=100×1.005×0.9 parts by mol=90.45 parts by mol and the content of Ca was 100×x×0.1 parts by mol=100×1.005×0.1 parts by mol=10.05 parts by mol, and mixed for a period of time in a ball mill with water as a medium. In addition, as accessory constituents, a Y$_2$O$_3$ powder was used instead of the Dy$_2$O$_3$ powder in Experimental Example 1, and a V$_2$O$_3$ powder was used instead of the MnCO$_3$ powder. Then, these powders were weighed for the contents of Y, Mg, V, Si, and Si in terms of the parts by mol in Table 3 with respect to 100 parts by mol of the Ti, and blended with the ceramic powder as a main constituent. In the same way as in Experimental Example 1 except for the foregoing, a ceramic powder was prepared from the compound represented in Table 3.

TABLE 3

| x | Y Amount (parts by mol) | Mg Amount (parts by mol) | V Amount (parts by mol) | Si Amount (parts by mol) |
|---|---|---|---|---|
| 1.005 | 1.0 | 1.0 | 0.2 | 2.0 |

It has been confirmed by an ICP emission spectrometric analysis that the obtained ceramic powder is nearly identical to the composition shown in Table 3.

(B) Preparation of Laminated Ceramic Capacitor

The dielectric ceramic powder was used to prepare laminated ceramic capacitors in the same way as in Experimental Example 1. The ceramic layer interposed between adjacent internal electrodes was adjusted to 0.7 μm in thickness.

It has been confirmed by an ICP emission spectrometric analysis that the sintered laminate (before the formation of external electrodes) obtained is nearly identical to the composition shown in Table 3, except for Ni as an internal electrode constituent.

(C) Characterization

The laminated ceramic capacitors obtained were evaluated for various types of characteristics by the same methods as in Experimental Example 1. Table 4 shows the results.

TABLE 4

| Sample Number | Percentage of Number of Lines (%) | Internal Electrode Thickness (μm) | Dielectric Constant (25° C.) |
|---|---|---|---|
| 31 | 7 | 0.49 | 4600 |
| 32 | 19 | 0.60 | 5500 |
| 33 | 15 | 0.55 | 5100 |
| *34 | 0 | 0.84 | 2700 |
| *35 | 0 | 0.75 | 2600 |
| *36 | 0 | 0.59 | 2000 |
| *37 | 0 | 0.48 | 1800 |
| *38 | 6 | 0.80 | 3100 |
| *39 | 11 | 0.70 | 3000 |
| *40 | 13 | 0.63 | 3200 |

In regard to sample numbers 34 to 37, the percentage of the number of lines on which ceramic particles are present in contact with both of the adjacent internal electrodes is 0%, and the dielectric constant is low regardless of the internal electrode thickness. In sample numbers 38 to 40, while ceramic particles are present in contact with both of the internal electrodes, the internal electrode thickness is 0.63 to 0.80 μm, and the dielectric constant is low. On the other hand, the percentage of the number of lines is 7 to 19% in sample numbers 31 to 33, and the internal electrode thickness is 0.49 to 0.60 μm. Furthermore, the dielectric constant not less than 4500, namely, it is 4600 to 5500.

Experimental Example 3

In Experimental Example 3, evaluated were laminated ceramic capacitors including ceramic layers containing, as their main constituent, a (Ba,Ca)(Ti,Zr)O$_3$ based ceramic.

(A) Preparation of Ceramic Powder

As starting raw materials for $(Ba_{0.9}Ca_{0.1})_x(Ti_{0.95}Zr_{0.05})O_3$ as a main constituent, respective powders of CaCO$_3$ and Zr$_2$O$_3$ were prepared in addition to the starting raw materials in Experimental Example 1. Then, these powders were weighed for the amounts shown in Table 5, that is, so that with respect to the total content 100 parts by mol of Ti and Zr, the content of Ba was 100×x×0.9 parts by mol=100×1.010×0.9 parts by mol=90.90 parts by mol and the content of Ca was 100×x×0.1 parts by mol=100×1.010×0.1 parts by mol=10.10 parts by mol, and mixed for a period of time in a ball mill with water as a medium. In addition, as accessory constituents, Gd$_2$O$_3$ was used instead of the Dy$_2$O$_3$ powder in Experimental Example 1. These powders were weighed for the contents of Gd, Mg, Mn, and Si in terms of parts by mol shown in Table 5 with respect to the total content 100 parts by mol of the Ti and Zr, and blended with the ceramic powder as a main constituent. In the same way as in Experimental Example 1 except for the foregoing, a ceramic powder was prepared from the compound represented in Table 5.

TABLE 5

| x | Gd Amount (parts by mol) | Mg Amount (parts by mol) | Mn Amount (parts by mol) | Si Amount (parts by mol) |
|---|---|---|---|---|
| 1.010 | 1.0 | 1.0 | 0.5 | 2.0 |

It has been confirmed by an ICP emission spectrometric analysis that the obtained ceramic powder is nearly identical to the composition shown in Table 5.

(B) Preparation of Laminated Ceramic Capacitor

The dielectric ceramic powder was used to prepare laminated ceramic capacitors in the same way as in Experimental Example 1. The ceramic layer interposed between adjacent internal electrodes was adjusted to 0.5 μm in thickness.

It has been confirmed by an ICP emission spectrometric analysis that the sintered laminate (before the formation of external electrodes) obtained is nearly identical to the composition shown in Table 5, except for Ni as an internal electrode constituent.

(C) Characterization

The laminated ceramic capacitors obtained were evaluated for various types of characteristics by the same methods as in Experimental Example 1. Table 6 shows the results.

TABLE 6

| Sample Number | Percentage of Number of Lines (%) | Internal Electrode Thickness (μm) | Dielectric Constant (25° C.) |
|---|---|---|---|
| 51 | 6 | 0.42 | 4800 |
| 52 | 11 | 0.60 | 5500 |
| 53 | 9 | 0.58 | 4700 |
| *54 | 0 | 0.81 | 2900 |
| *55 | 0 | 0.75 | 2700 |
| *56 | 0 | 0.60 | 2600 |
| *57 | 0 | 0.54 | 2100 |
| *58 | 8 | 0.73 | 3300 |
| *59 | 11 | 0.69 | 3400 |
| *60 | 7 | 0.62 | 3000 |

In sample numbers 54 to 57, the percentage of the number of lines on which ceramic particles are present in contact with both of the adjacent internal electrodes is 0%, and the dielectric constant is low regardless of the internal electrode thickness. sample numbers 58 to 60, while ceramic particles are present in contact with both of the internal electrodes, the internal electrode thickness is 0.62 to 0.73 μm, and the dielectric constant is low. On the other hand, in sample numbers 51 to 53, the percentage of the number of lines is 6 to 11%, and the internal electrode thickness is 0.42 to 0.60 μm. Furthermore, the dielectric constant is 4700 to 5500, which is not less than 4500.

DESCRIPTION OF REFERENCE SYMBOLS

1 laminated ceramic capacitor
2 ceramic layer
3, 4 internal electrode
5 laminate
6, 7 external electrode

The invention claimed is:

1. A laminated ceramic capacitor comprising a laminate having a plurality of stacked ceramic layers and a plurality of internal electrodes disposed at interfaces between ceramic layers; and a plurality of external electrodes disposed on an outer surface of the laminate and electrically connected to internal electrodes,
wherein the ceramic layers interposed between adjacent internal electrodes have ceramic grains in contact with both of the adjacent internal electrodes,
the internal electrodes are 0.42 μm or greater and 0.60 μm or less in thickness,
the ceramic layers are 0.5 μm or greater and 0.8 μm or less in thickness,
of 100 lines drawn perpendicular to the internal electrodes at an interval of the average grain size of the ceramic grains in a cross section of the ceramic layer, the percentage of the number of lines on which ceramic grains are present in contact with both of the adjacent internal electrodes is 5 to 20%, and
the ceramic layers contain, as their main constituent, a perovskite-type compound containing Ba and Ti, in which some of Ba is optionally substituted with at least one of Ca and Sr, and some of Ti is optionally substituted with Zr.

2. The laminated ceramic capacitor according to claim 1, wherein the percentage of the number of lines on which ceramic grains are present in contact with both of the adjacent internal electrodes is 6 to 19%.

3. The laminated ceramic capacitor according to claim 2, wherein the internal electrodes are 0.58 μm or less in thickness.

4. The laminated ceramic capacitor according to claim 1, wherein the perovskite-type compound is barium titanate.

5. The laminated ceramic capacitor according to claim 1, wherein the perovskite-type compound is barium calcium titanate.

6. The laminated ceramic capacitor according to claim 1, wherein the perovskite-type compound containing Ba and Ti has some of Ba is substituted with Ca, and some of Ti is substituted with Zr.

7. The laminated ceramic capacitor according to claim 1, wherein the perovskite-type compound containing Ba and Ti has some of Ba is substituted with Sr.

* * * * *